Patented Apr. 19, 1949

2,467,780

UNITED STATES PATENT OFFICE 2,467,780

METHOD OF MAKING A METALLIC ALUMINUM SOLDER

Otto Fred Reinhold, Irvington, N. J.

No Drawing. Application January 13, 1947, Serial No. 721,870

2 Claims. (Cl. 75—175)

The present invention relates to metallic solders and more especialy to ternary solders of tin, zinc and aluminum, and the method of making the same.

Soldering aluminum to aluminum or to other metals has been found to be difficult or impossible although many attempts have been made to accomplish the same. The reasons for the failure of aluminum solders are well known and include inadequate adhesion and holding power, unduly high temperature of soldering operation with consequent production of embrittlement and hot shortness, inflexibility of soldering composition for varying aluminum alloys and other conditions encountered in use and general inability to form tough alloys of good tensile strengths.

One of the objects of the present invention is to provide a solder for aluminum-to-aluminum and other metals which overcomes the deficiencies and disadvantages outlined above and which for the first time makes it possible to produce satisfactory soldered joints of aluminum having long life and good physical properties.

Another object of the invention resides in the provision of an aluminum solder having a relatively low melting point and wherein solders having a considerable range of melting points can be made available by relatively slight compositional changes.

A further object of the invention lies in the production of ternary compositions suitable for soldering a wide variety of aluminum articles ranging from fine wires to large castings.

A still further object of the invention is to solder aluminum to aluminum and other metals and alloys by means of my new solder in such manner as to produce repaired articles having good physical properties equal or superior to those of the articles as initially produced.

Other and still further objects and advantages will be appreciated and understood by those skilled in this art or will be apparent or pointed out hereinafter.

My new solder is essentially comprised of a ternary composition made up of tin, zinc and aluminum cast into stocks, rods, bars or other desired shapes. My new solder may optionally contain a small amount of an additional metal such as cadmium, bismuth, silver or gold to provide melting point control, high tensile strength and greatly improved adhesion between the solder and the materials soldered therewith. In general, the solder contains from about 70% to about 85% of tin, from about 25% to about 12.50% of zinc and from about 5.0% to about 2.50% of aluminum. When the optional metals are employed, they are used in an amount up to about 0.50%. As little as about 0.01% may, however, be incorporated in some cases. Silver and gold are used to raise the melting point of the solder and cadmium and bismuth to lower it. The following examples illustrate typical compositions without constituting limitations upon the invention:

|   | Tin | Zinc | Aluminum | Optional Metal |
|---|---|---|---|---|
|   | Per cent | Per cent | Per cent |   |
| 1 | 70 | 25 | 5 |   |
| 2 | 75 | 20 | 5 |   |
| 3 | 80 | 15 | 5 |   |
| 4 | 85 | 12.5 | 2.5 |   |
| 5 | 84.75 | 12.25 | 2.5 | 0.5% cadmium. |
| 6 | 74.95 | 19.95 | 5 | 0.1% silver. |

Referring to Examples 1, 2, 3 and 4, the solder of Example 1 has the highest melting point and that of Example 4 has the lowest melting point. Thus, increasing percentages of tin and decreasing percentages of zinc with the percentage of aluminum stationary or decreasing slightly give solders with progressively decreasing melting points. The range of melting points represented by Examples 1-4, inclusive, is from about 850° F. to about 400° F., respectively. The solders of the higher melting points (from about 750-850° F.) are particularly suitable for filling the blow-holes in castings of aluminum whereas the solders of the lower melting points (from about 400-465° F.) are particularly useful for repairing fine instruments such as hair wires and other small or thin parts of measuring or indicating instruments, gauges, etc. The solders of Examples 5 and 6 are employed when, because of the construction, composition or usage of the device, article or part soldered, it is especially important that maximum adhesion be achieved and that the soldered device, article or part have high tensile strength. The use of 0.01–0.50% of silver, gold, cadmium or bismuth or any combination of two or more of such elements contributes melting point control, high tensile strength, optimum adhesion between the solder and the soldered materials, grain refinement and general metallurgical beneficiation. Other optional metals in addition to those enumerated may also be incorporated in my new solder for melting point control and other purposes.

My new solder is prepared for use by melting together the desired amounts of the specified metals in a suitable vessel and maintaining constant stirring thereof. To the molten composition I then add under continued stirring a small amount of a mixture composed of the following ingredients in approximately the following proportions:

| | | |
|---|---|---|
| Zinc chloride | grams | 10 |
| Urea (natural) | do | 5 |
| Uranium chloride | milligrams | 2 |

After the addition of the above mixture, dross appears on the surface of the molten metals and is skimmed off until a clean molten mass is produced which is then poured into zinc or other suitable molds and allowed to harden in desired shapes which are then removed and stored for a minimum of about four weeks for aging purposes, since I have discovered that such aged solder is far superior to the freshly made solder for accomplishing the objects of this invention. The chloride mixture acts as a deoxidizing agent on the molten solder and ensures the formation of clean, sound soldered joints having long life when soldering is carried out with the finished aged composition. Since the amount of deoxidizing agent used is small, it does not appreciably or objectionably increase the cost of the finished solder. The amount of deoxidizing agent may be varied but enough should be added to ensure complete cleansing of the molten metals. This can be readily determined by preliminary testing but does not exceed 1% of the weight of the molten metals and is usually less than 0.5%. The amount necessary will, however, depend upon the "dirtiness" of the metals and the oxygen or oxide content thereof to be removed.

In accordance with a modified procedure, I first melt the zinc and aluminum constituents only and, while stirring the same constantly with a porcelain stirrer, I add thereto a small amount of the above deoxidizing agent and remove the dross which appears. The composition is then wetted down with a few (about 5) cubic centimeters of water and again stirred. The remaining dross appears on the surface and is skimmed off. This Zn-Al composition is poured into molds and cooled. The sticks, rods, bars, etc., thereby produced are aged for at least about four weeks. It is understood in this connection that the Zn:Al ratio of this intermediate material is such that by the addition of tin any of the above exemplary compositions may be prepared. A Zn:Al ratio of 5:1 is particularly useful. In making the composition of Example 1, for instance, seven (7) parts of tin are melted and three (3) parts (by weight) of the aged Zn-Al intermediate composition are added thereto and the whole constantly stirred. When melting is complete, a few grains of the deoxidizing agent are added and after the subsidence of the ensuing reaction the solder is poured into molds and cooled to form sticks, rods, bars or other suitable or desired shapes ready for use in soldering.

As above pointed out, my new solder can be put to a variety of uses. The composition of Example 1 is particularly suitable for plugging up or evening off unevennesses in castings or blow holes existing therein. The composition of Example 4 is adapted for soldering fine wires or delicate parts of instruments of various sorts. Example 5 has a very low melting point and Example 6 has a high melting point, thus illustrating the use of the optional metals for melting point control. In making the solders of Examples 5 and 6, the indicated amount of the optional metal is preferably introduced into the otherwise completed molten mix just before pouring the same into the molds, the mix being stirred sufficiently to ensure the attainment of a homogeneous melt.

I have discovered that the use of uranium chloride and urea in the deoxidizing mixture results in better penetration of the solder into the materials to be soldered, with a correspondingly better union of the soldered parts. In addition, there results a better molecular cohesion of the soldered parts accompanied by a substantially increased joint life.

Having thus described my invention, what I claim as new and desire to secure by Letters Patent, is:

1. A method of making a ternary solder comprising about 70–85% tin, about 25–12.5% zinc, and about 5–2.5% aluminum, which comprises the steps of melting together predetermined amounts of tin, zinc and aluminum, maintaining the molten mixture under constant agitation, adding a deoxidizing agent composed of zinc chloride, natural urea and uranium chloride in the relative proportions of 10 grams, 5 grams and 2 milligrams, by weight, removing dross from the molten mixture and casting the latter in molds.

2. A method of making a ternary solder as defined in claim 1, in which the cast solder when hardened, is permitted to stand for a minimum period of about four weeks prior to use thereof.

OTTO FRED REINHOLD.

REFERENCES CITED

The following references are of record in the file of this patent:

UNITED STATES PATENTS

| Number | Name | Date |
|---|---|---|
| 157,140 | Southworth | Nov. 24, 1874 |
| 474,295 | Fowler | May 3, 1892 |
| 500,125 | Guttner | June 27, 1893 |
| 1,097,926 | Koper | May 26, 1914 |
| 1,437,641 | Ferriere et al. | Dec. 5, 1922 |
| 1,926,853 | Callis et al. | Sept. 12, 1933 |
| 2,004,372 | Luschenowsky | June 11, 1935 |
| 2,109,387 | Hanson et al. | Feb. 22, 1938 |
| 2,333,989 | Diem | Nov. 9, 1943 |

FOREIGN PATENTS

| Number | Country | Date |
|---|---|---|
| 13,689 | Great Britain, 1907 | Sept. 14, 1908 |
| 175,228 | Great Britain | Feb. 16, 1922 |